United States Patent [19]

Harteck

[11] 4,426,367

[45] * Jan. 17, 1984

[54] FIXATION OF NITROGEN IN THE PRESENCE OF WATER VAPOR

[75] Inventor: Paul Harteck, Santa Barbara, Calif.

[73] Assignee: Rensselaer Polytechnic Institute, Troy, N.Y.

[ * ] Notice: The portion of the term of this patent subsequent to Jun. 2, 1999 has been disclaimed.

[21] Appl. No.: 368,049

[22] Filed: Apr. 14, 1982

[51] Int. Cl.$^3$ ............................................. C01B 21/48
[52] U.S. Cl. .................................... 423/395; 423/400; 423/402
[58] Field of Search ........................ 423/395, 400, 402

[56] References Cited

U.S. PATENT DOCUMENTS

| | | | |
|---|---|---|---|
| 1,954,415 | 4/1934 | Kipper | 423/395 |
| 4,271,137 | 6/1981 | Harteck | 423/395 |
| 4,308,246 | 12/1981 | Harteck | 423/395 |

FOREIGN PATENT DOCUMENTS 23045 of 1911 United Kingdom ................ 423/402

OTHER PUBLICATIONS

Primak, W. et al., "Nucleonics", vol. 13, No. 3, Mar. 1955, pp. 38–41.

Primary Examiner—Edward J. Meros
Assistant Examiner—Wayne A. Langel
Attorney, Agent, or Firm—McGlew and Tuttle

[57] ABSTRACT

A process for the fixation of nitrogen is disclosed which comprises combining a mixture of nitrogen, oxygen, metal oxide and water vapor, initially heating the combination to initiate a reaction which forms nitrate, but at a temperature and pressure range below the dissociation pressure of the nitrate. With or without the water component, the yield of fixed nitrogen is increased by the use of a Linde Molecular Sieve Catalyst.

9 Claims, No Drawings

FIXATION OF NITROGEN IN THE PRESENCE OF WATER VAPOR

The Government has rights in this invention pursuant to Contract No. DE-FG02-79ER00082 awarded by the U.S. Department of Energy.

FIELD AND BACKGROUND OF THE INVENTION

The present invention relates in general to the fixation of nitrogen and, in particular to a new and useful process which utilizes water vapor in a nitrogen fixation reaction to improve the yield of fixed nitrogen.

In general, nitrogen fixation involves the utilization of atmospheric nitrogen to form nitrogen compounds. In nature, nitrogen fixation is formed by bacteria located on the root hairs of plants. Industrial nitrogen fixation is exemplified by the production of ammonia using gaseous mixtures containing hydrogen and nitrogen.

Examples of nitrogen fixation processes can be found in French Pat. No. 798,224 to Basset; U.S. Pat. Nos. 1,954,415 to Kipper; and 3,333,923 to Leatham et al.

The inventor of the present invention, by his U.S. Pat. Nos. 4,271,137 and 4,308,246, has introduced an improved nitrogen fixation process which takes advantage of a thermodynamic equilibrium between reaction of nitrogen and oxygen to form nitrogen oxides and the nitrogen oxides plus solids that produce nitrates. An improved catalyst for these reactions has also been disclosed.

The nitrogen fixation process disclosed in these two last mentioned patents have substantially improved efficiency with regard to the amount of energy required to yield fixed nitrogen.

In view of the important industrial uses to which fixed nitrogen may be put, it remains desirable to improve the efficiency and yield of the nitrogen fixation process.

SUMMARY OF THE INVENTION

The present invention utilizes various portions of the insights disclosed in the inventor's above-identified patents plus a new insight and discovery involving the addition of water to the nitrogen fixation reaction, which has been found to significantly improve the yield of fixed nitrogen.

It has also been found that a particular catalyst significantly improves the yield of fixed nitrogen. The catalyst, known as Linde Molecular Sieve catalyst base, LZ-Y52 (a trade name) is apparently advantageous by providing increased surface area for the prevailing reactions. Catalyst Base LZ-Y52 is a Linde Type NaY Molecular Sieve having a high purity sodium alumino-silicate crystalline structure with uniform distribution of cation exchange sites, and can be obtained from the Alpha Products Company.

As noted above, the inventor has disclosed a nitrogen fixation process with improved efficiency in his above-identified patents, which are incorporated here by reference.

In developing his nitrogen fixation process further, the inventor observed that a reaction which may be considered the inverse or opposite to nitrogen fixation, namely the decomposition of nitric acid, yielded water as one of the byproducts.

In the *Textbook of Inorganic Chemistry* by K. A. Hofmann, 4th Edition 1922, F. Vieweg & Sohn, Braunschweig, there is on page 103 a pertinent comment which is translated as follows: "In the light, or by distillation, nitric acid free of water, is partly decomposed into reddish brown $NO_2$, $H_2O$ and $O_2$, according to the equation:

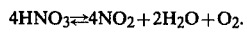

In the dark and at room temperature this dissociation is practically reversed. But if the $HNO_3$ vapor is streaming through a red glowing tube filled with porous clay or pumice, the $HNO_3$ becomes entirely decomposed,

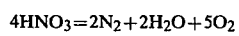

and this decomposition is irreversible. By this method the composition of nitric acid was determined."

Due to the principle of microscopic reversibility, the reverse reaction $(2N_2+2H_2O+5O_2=4HNO_3)$ is possible. In a dynamic chemical equilibrium the principle of microscopic reversibility refers to the fact that the forward reaction must be of the same rate as the reverse reaction so that there is no net reaction, which is implied by the statement that the system is in dynamic chemical equilibrium. At equilibrium under the conditions discussed, most of the gases will be $N_2$, $H_2O$, and $O_2$ with little $HNO_3$.

Water thus, as indicated by the reaction above, can be a critical reactant. In view of this, experiments were performed at one atmosphere with equal amounts of oxygen and nitrogen, which contained 4.6, 6.0 and 18 mm $H_2O$ vapor respectively. Also, experiments at 3 atmospheres and at 100 atmospheres were made, dry and with $H_2O$ concentrations ranging up to several atmospheres partial pressure. In all these experiments the rate of NO, and $NO_2$, chemical formation had substantially increased. At catalysts Pt, Pd, $Co_3O_4$, $Fe_2O_3$, CuO, asbestos, quartz wool, quartz-powder with silver, gold, $Nd_2O_3$, and $La_2O_3$ were used. A series of commercial catalysts including Pt, Pa Co, Fe, and Cr, most of which were supported on $SiO_2$ or $Al_2O_3$, were also tried.

In most cases the rate of nitrogen fixation was proportional to the $H_2O$ concentration. In some cases using quartz wool or other substances with large surface areas, the rate was proportional between the half order and first order of the concentration of water vapor. The rate of nitrogen-fixation using a good catalyst was over $10^{13}$ molecules (as NO, $NO_2$ and $HNO_3$) per cm$^3$ of catalyst per second using at one atmosphere an equal mixture of nitrogen and oxygen, with some $H_2O$ vapor.

From these results it was concluded that the overall pressure dependence of nitrogen fixation would be a function of the catalyst, the temperature, the total pressure and the ratio of the partial pressures ($N_2$, $O_2$, $H_2O$). Assuming a temperature between 550° and 650° C., a pressure in the range of between 300 and 500 atmospheres, it was expected that a rate of formation of about $6\times10^{23}$ molecules of fixed nitrogen per m$^3$ of catalyst per second would be obtainable. This is equivalent to one mole fixed nitrogen per second, or for one year, $3\times10^7$ moles or 420 tons of fixed nitrogen. Further, an increase of the efficiency of the catalyst, even only be a small factor, was expected to reduce the production cost of fixed nitrogen substantially.

By further experimentation, some results of which will be set forth here, the importance of the water vapor for the nitrogen fixation process has been established. Furthermore, a series of catalysts have been found which can be used, and these are estimated to cost less than the iron or iron-alloy container for the process itself. Temperatures in the range of 550° C. to 650° are appropriate with total pressures in the range of hundreds of atmospheres.

Accordingly, an object of the present invention is to provide a process for the fixation of nitrogen which comprises combining gaseous nitrogen and oxygen at a total pressure of above 100 atm. and a working pressure range, with a metal oxide and water, initially heating the combination to a working temperature range sufficient to form a nitrate and below the dissociation pressure of the nitrate corresponding to the working temperature and pressure ranges, thermally insulating or isolating the reaction to maintain the working temperature range without substantial additional heat being required, and providing a temperature range near thermal equilibrium for the nitrogen and oxygen to nitrogen oxides reaction.

A further object of the invention is to provide such a process where the water may be deleted or maintained but where the reaction is conducted in the presence of a catalyst comprising Linde Molecular Sieve catalyst base.

A still further object of the invention is to provide such a reaction, with and without water vapor, wherein the temperature range is between about 475° C. and 800° C., and preferably within range of 500° C. to 650° C.

The various features of novelty which characterize the invention are pointed out with particularity in the claims annexed to and forming a part of this disclosure. For a better understanding of the invention, its operating advantages and specific objects obtained by its uses, reference is made to the accompanying descriptive matter in which preferred embodiments of the invention are illustrated.

DESCRIPTION OF THE PREFERRED EMBODIMENTS

A typical reaction for the invention is:

$$N_2 + O_2 + \text{solid} \rightarrow \text{solid nitrate}.$$

A specific example of the overall reaction using strontium oxide as the solid is:

$$N_2 + (5/2)O_2 + SrO \rightarrow Sr(NO_3)_2$$

In greater detail, the reaction first involves the establishment of conditions which tend to form an equilibrium between the nitrogen and oxygen on the one hand and nitrogen oxides on the other hand. The reaction of nitrogen and oxygen to form the nitrogen oxides is enhanced by a catalyst. The equilibrium reaction is:

$$N_2 + O_2 \underset{}{\overset{\text{catalyzer}}{\rightleftharpoons}} NO + NO_2 + N_2O$$

In the example using the strontium oxide, this solid oxide will combine with the nitrogen dioxide to form the strontium nitrate under the proper chemical conditions according to the following:

$$SrO + 2NO_2 + \tfrac{1}{2}O_2 \rightleftharpoons Sr(NO_3)_2$$

The establishment of conditions which tend to form an equilibrium between the gas mixture including the solid oxide and the nitrate requires a temperature range high enough to efficiently produce the nitrate at high yields but still lower than the dissociation pressures of the nitrate. This requires a temperature range of between about 500° C. to 800° C. To maintain this temperature, the reactive mixture is first heated and then the reaction must either be heated or cooled depending on the conditions prevailing thereafter. The pressure should be above 100 atm.

According to the invention, it has been found that the addition of water vapor in the above-identified combined reaction enhances the production of fixed nitrogen as an end product. The fixed nitrogen may be removed from the overall reaction, which now also produces nitric acid, by tapping the nitric acid, by tapping the nitric acid, by tapping the nitrate or by tapping the nitrogen oxide components directly.

According to another feature of the invention which may utilize water vapor in the reaction or be conducted without water vapor, is the use of Linde Molecular Sieve No. LZ-Y52 as a catalyst. The use of this specific catalyst improves nitrogen fixation performance by 30 to 100 times over previously used catalysts in the temperature range of 500 to 650° C. and at a pressure range of 1 atmosphere.

Many experiments were run to verify the usefulness of water and/or the molecular sieve catalyst in the nitrogen fixation process. These experiments are grouped and outlined below.

(1) Decomposition of NO and $NO_2$ with catalyst at 700°→800° C.; at about 1 atm; about 50 experiments run.

(2) Formation of $NO_2 + NO$ with catalyst at ~750° C.±50; 1 atm; 50% $N_2$ + 50% $O_2$; 30 experiments run.

(3) Control: $NO_2 + NO$ formation at ~750°±50; 1 atm; pure $N_2$; ~25 experiments run.

(4) Effect of water vapor (0.5~15% by weight $H_2O$) on the rate of nitrogen-fixation at ~600° C. and less; 1 atm; ~30 experiments run.

(5) Nitrogen-fixation at ~650° C. and less; ~100 atm; (0→2% $H_2O$) 50% $N_2$ + 50% $O_2$, other ratios were considered.

(6) Linde Catalyst: Linde Molecular Sieve #LZ-Y52 catalyst performed 30 to 100 times better than other previously used catalyst; at 500°→650° C.; 1 atm; (0.5→10% $H_2O$) 50%$N_2$ + 50% $O_2$; ~10 experiments run.

The experiments under (1), (2) and (3) were of an introductory nature with regard to this invention.

The experiments under (1) are important because, due to the principle of microscopic reversibility, the catalysts which decompose NO and $NO_2$ actively at ~700° C. in an oxidizing atmosphere should also form the nitrogen oxides relatively actively, but by 3 to 4.5 decades slower because of the equilibrium $O_2 + N_2 \rightleftharpoons 2$ NO lies, at ~700° C., to ~99.9% on the $O_2 + N_2$ side. The exact mechanism of the reaction is not well known. It was found by these experiments that Pt, Pd, Co, Fe and others would be good candidates for this synthesis work.

The group (2) by using 10 to 50 g of the catalysts mentioned above in group (1), it was found that in a 50% $N_2$ + 50% $O_2$ mixture with a few mm $H_2O$ vapor, about $10^{12}$ molecules of fixed nitrogen per second per cm$^3$ of catalyst were formed. The amount of NO$_2$ formed had been determined by letting the gas bubble through water +H$_2$O$_2$ and using an adequate indicator. Furthermore, the NO$_3^-$ concentration was measured with an ion electrode, which was sensitive to NO$_3^-$ ions. Both methods gave the same results. The majority of the experiments were analyzed using a photochemical method which was far more sensitive and reproducable (by orders of magnitude) than the earlier methods.

The group (3) experiments were run as a control. It was very important that no NO$_2$ or NO could have been formed or introduced by means other than the catalytic process. To make sure that this did not occur, pure nitrogen was used instead of a 50% N$_2$+50% O$_2$ mixture. In all these "blank" experiments, within small limits of error, no NO or NO$_2$ formation were observed.

As noted above, and with regard to the group (4) experiments, it was concluded with water vapor would enhance the rate of formation of NO+NO$_2$. This did indeed occur, and the H$_2$O vapor was found to be even more active a catalyst than had been expected. The situation is more complex, however, because there occurred in addition to the NO$_2$+NO formation, the formation of HNO$_3$. Regardless, it seems to make little difference what type of fixed nitrogen (NO,NO$_2$ or HNO$_3$) reacts in the reactor with the metal oxide to make nitrates. At high pressures the equilibrium: NO+O$_2$⇌NO$_2$ is established so fast (only a few seconds) that during a depressurization step, the ratio can change substantially.

According to group (5) a gas mixture at 100 atmospheres and of 50% N$_2$+50% O$_2$, with a metal oxide which forms an identifiable nitrate was put into the reactor at 500°→600° C. The reactor was filled with Co$_3$O$_4$ at 500° C. and 100 atm. 50% O$_2$+50% N$_2$+~2 atm H$_2$O vapor. A temperature gradient was found to exist to which resulted in the Co$_3$O$_4$ catalyst at either end of the reactor being at a temperature of ~250° C. Also a nitrate of the type: Co(NO$_3$)$_2$ had indeed been formed. Experiments to directly form Sr(NO$_3$)$_2$ and Ca(NO$_3$)$_2$ in the reactor are now possible because a molecular sieve catalyst was found, (see below) which at 500° C., is still reasonably active.

The molecular sieve catalyst was used in group (6). The catalyst is a molecular sieve composed an an alumina-silicate. It is manufactured by the Linde Company for use as a catalyst base. It is more active than any previously investigated catalyst by a factor of 30 to 100 and may even be improved.

The results of some exemplary experiments are outlined below. The experiment conditions were such that comparison could be made between the different catalysts. These experiments also demonstrate the order of dependency on the water vapor concentration, with priority given to determining the maximum rate of nitrogen oxides formation under a given set of conditions.

EXPERIMENT (1)

Co$_3$O$_4$ was supported on Kieselguhr, manufactured by United Catalysts, Inc., produced as NO, $1.9 \times 10^{10}$ molecules per sec. This was at 600° C., a flow of 0.5 cm$^3$ per sec with 1 gram of catalyst, and 1 atm. of 50% N$_2$+50% O$_2$. These are considered the standard conditions. Rates of $8.1 \times 10^{10}$ and $3.8 \times 10^{10}$ molecules of NO per sec were recorded with concentrations of 2.3% and 0.7% by weight water vapor respectively. This suggests a dependence on the water vapor concentration of 0.7. However, experimental error does not permit a determination wether this is 1st order or the square root or, because of a complex reaction mechanism, actually 0.7 order. A rate of $2.0 \times 10^{11}$ molecules of NO+NO$_2$+HNO$_3$ per sec was found for a gas mixture containing a water vapor concentration of 7.3%. This gives a dependence of 0.8 when the rate of formation with 2.3% water vapor is used for the determination.

Since the N$_2$ and O$_2$ concentrations vary as the water vapor concentration varies care must be taken that rates of formation be compared where the change in concentration of the N$_2$ and O$_2$ are small or else a significant change in the rate of formation will occur just because the rate also depends on the N$_2$ and O$_2$ concentrations. This would probably cause the dependence with respect to the water vapor concentration to seem less than it really is. Also, it must be noted that the rate of concentrations of 0.8% and 2.3% water vapor were for NO formation only. Whereas, the rate of formation for 7.3% water vapor concentration was for NO, NO$_2$ and HNO$_3$. This will cause the dependence on water to seem greater than it really is.

The results of this and the following experiments are presented in the table which shows rates of formation of nitrogen under the standard conditions defined above.

EXPERIMENT (2)

Fe$_2$O$_3$ was supported on alumina and was supplied by Alfa Products. This catalyst produced, under the standard conditions, NO at a rate of $7.4 \times 10^{10}$ and $8.2 \times 10^9$ molecules per sec. The gas mixture contained 1.9% and 0.5% water vapor respectively. This indicates a 1.6 order dependence on the water vapor concentration. At higher water vapor concentrations, 44% and 19%, rates of $3.2 \times 10^{11}$ and $9.3 \times 10^{10}$ molecules of NO+NO$_2$+HNO$_3$ per sec respectively were observed. This indicates an order of 1.5.

EXPERIMENT (3)

Pure NiO powder was used. Under the standard conditions $5.7 \times 10^9$ and $1.5 \times 10^9$ molecules of NO per sec were produced with water concentrations of 1.4% and 0.6% respectively from which an order of 1.0 is obtained. A rate of $8 \times 10^8$ molecules of NO per sec was observed when there was no water vapor present in the gas mixture.

EXPERIMENT (4)

The Linde Molecular Sieve Catalyst Base, LZ-Y52, obtained from Alfa Products, was used in an unmodified form. Rates of $3.8 \times 10^{12}$ and $1.4 \times 10^{12}$ molecules of NO+NO$_2$+HNO$_3$ per sec with water vapor concentrations of 2.0% and 0.6%

TABLE

RATES OF FIXATION OF NITROGEN UNDER THE STANDARD CONDITIONS AND NORMALIZED TO SPECIFIC WATER VAPOR CONCENTRATIONS

| Catalyst | Dependence on Water Vapor Concentration | Concentration of Water Vapor (% of Total Pressure) | Rate of Formation of Fixed Nitrogen* (molecules/sec) | Maximum Rate of Nitrogen Fixation* Observed (Molecules/sec) |
|---|---|---|---|---|
| (1) $Co_3O_4$ | 0.8 | 10.0 | $2.6 \times 10^{11}$ | $6 \times 10^{11}$ |
|  | 0.7 | 3.0 | $9.8 \times 10^{10}$ | $2 \times 10^{11}$ |
|  | 0.7 | 0.5 | $3.0 \times 10^{10}$ | $7 \times 10^{10}$ |
| (2) $Fe_2O_3$ | 1.5 | 44 | $3.2 \times 10^{11}$ | $7 \times 10^{12}$ |
|  | 1.5 | 19 | $9.3 \times 10^{10}$ | $3 \times 10^{11}$ |
|  | 1.6 | 10.0 | $1.1 \times 10^{12}$ | $2 \times 10^{12}$ |
|  | 1.6 | 3.0 | $1.5 \times 10^{11}$ | $3 \times 10^{11}$ |
|  | 1.6 | 0.5 | $8.2 \times 10^{9}$ | $3 \times 10^{10}$ |
| (3) NiO | 1.0 | 10.0 | $2.5 \times 10^{10}$ | $9 \times 10^{10}$ |
|  | 1.0 | 3.0 | $7.5 \times 10^{9}$ | $3 \times 10^{10}$ |
|  | 1.0 | 0.5 | $1.2 \times 10^{9}$ | $5 \times 10^{9}$ |
|  | — | 0. | $8.0 \times 10^{8}$ | $1 \times 10^{9}$ |
| (4) Linde Molecular Sieve | 1.9 | 44 | $1.3 \times 10^{13}$ | $1 \times 10^{14}$ |
|  | 1.9 | 19 | $3.1 \times 10^{12}$ | $3 \times 10^{13}$ |
|  | 0.8 | 10.0 | $1.4 \times 10^{13}$ | $2 \times 10^{14}$ |
|  | 0.8 | 3.0 | $5.3 \times 10^{12}$ | $6 \times 10^{13}$ |
|  | 0.8 | 0.5 | $1.2 \times 10^{12}$ | $1 \times 10^{13}$ |

*At the lower concentrations of water vapor the rate of formation of NO was only measured. The total rate of nitrogen fixation could be as much as a factor of 10 greater.

respectively giving an order of 0.8. At higher water concentrations, however, an order of 1.9 was found. For water vapor concentrations of 26.3% and 18.8% rates of $4.9 \times 10^{12}$ and $3.0 \times 10^{12}$ molecules of $NO + NO_2 + HNO_3$ per sec were observed.

The foregoing experiments were each repeated many number of times to verify the results.

A small number of experiments were also performed at 100 atms. While flowing at 0.5 cm$^3$/sec at only 500° C. and with ~2% water vapor a rate of NO formation of $5.55 \times 10^{10}$ molecules per sec was measured. The flow was stopped for 12 hours. A sample was withdrawn and a concentration of $1.4 \times 10^{14}$ molecules per cm$^3$ was observed. In both cases the values are minimum values. The chemiluminescent method of analysis used cannot measure $NO_2$ or $HNO_3$ concentrations. Therefore, the values given could be low by as much as a factor of 10. It is possible that equilibrium conditions were approached or even attained.

The development of this new and less costly method of fixing nitrogen is multidimensional. It includes the contributions of the inventor's above noted patents plus this disclosure. The following factors must be considered for the process:

(1) the substance best suited for reacting with the nitrogen oxides to form a nitrate, e.g. the metal oxide, must be found;

(2) the equilibrium (listed below), between the metal oxides and their nitrates must be calculated, $MeO + N_2 + 5/2O_2 \rightleftharpoons Me(NO_3)_2$
and $Me(NO_3)_2 \rightleftharpoons MeO + 2NO = 3/2O_2$
or $Me(NO_3)_2 \rightleftharpoons 2NO_2 + \frac{1}{2}O_2$;

(3) the chemical and physical behavior of the metal oxides and the nitrates must be considered;

(4) a catalyst must be found which, at 580° C. to 780° C. or, if possible 530° C. to 630° C., is sufficiently active to produce NO and $NO_2$ at an ecominical rate, that is, at a rate which would produce fixed nitrogen at a cost competitive with other methods, e.g. the Linde catalyst;

(5) the chemical and physical behavior at the extreme temperatures and pressures of the reaction conditions must be taken into consideration; and (6) the cost of the steel of a reaction vessel for the process must be examined with respect to temperature and pressure ranges of the reaction conditions.

The concept of fixing nitrogen by this new method was partly originated by the fact that NO and $NO_2$ are in thermal equilibrium, to a small but not negligible extent. Therefore, if the kinetics of the formation and decomposition of NO and $NO_2$ are known, the rate of formation from the rate of decomposition of NO and $NO_2$ and the known thermal equilibrium with $N_2$ and $O_2$ can be calculated. At present certain mechanisms are assumed because a major portion of these reactions are not well understood. For simplification it is assumed that the formation and the decomposition of NO and $NO_2$ are directly proportional to the NO and $NO_2$ concentrations. Therefore, at 730° C. in a 50% $N_2$+50% $O_2$ gas mixture at a total pressure of 1 atmosphere, at equilibrium the NO partial pressure is $4 \times 10^{-5}$ atm. and the $NO_2$ partial pressure is $3.5 \times 10^{-6}$ atm. At 800 atm. the NO partial pressure is $3.2 \times 10^{-2}$ atm. and the $NO_2$ partial pressure is $8 \times 10^{-2}$ atm. The NO partial pressure is, at 800 atm., larger by a factor of 800. The $NO + NO_2$ partial pressure is larger by a factor of 2600. Dry $NO_2$ at $\frac{1}{2}$ atm. and 730° C. is decomposed at a rate of $1.6 \times 10^{17}$ $NO_2$ molecules per sec. At 1 atmosphere of 50% $N_2$+50% $O_2$, under the same conditions, $\sim 10^{12}$ $NO_2$ molecules per sec should be formed. This agrees with the experiments set forth above.

The pressure dependence of the overall process of nitrogen fixation is interrelated with the specific catalyst used and the mechanism of the formation and decomposition of NO and $NO_2$.

The critical rate of formation of NO and $NO_2$ at high pressure is $\sim 10^{17}$ molecules per cm$^3$ of catalyst per sec. A rate of $10^{16}$ molecules per cm$^3$ of catalyst per sec would be too slow to make this new process economically competitive. In the experiments done concerning catalysts, if the rate of formation was less than or equal to $10^{10}$ molecules per cm$^3$ of catalyst per sec, the experiments involved were suspended. The pressure dependence of catalysts use in such experiments, may warrant their reinvesting action at high pressures. For example, if the rate of formation for a catalyst is $10^{10}$ molecules of fixed nitrogen per cm of catalyst per sec at 1 atmosphere, then the following rates would be expected for first, second and 5/2 order at 1000 atms: $10^{13}$, $10^{16}$, and $10^{17.5}$ molecules of NO and $NO_2$ per $cm^3$ of catalyst per sec.

As noted above, a series of catalysts have been found which form NO and $NO_2$ at a rate of $\sim 10^{12}$ molecules per $cm^3$ of catalyst per sec at 1 atm. with a 50% $N_2$+50% $O_2$+3% water vapor. At 320 atmospheres this would be $3.2 \times 10^{14}$ molecules per $cm^3$ of catalyst per sec if the pressure dependence is first order. If the pressure dependence is second order then the rate at 320 atm. would be $10^{17}$ molecules per $cm^3$ of catalyst per sec.

At 600° C., 1 atm., 50% $N_2$+50% $O_2$+3% water vapor, it was found that $10^{12}$ molecules of NO and $NO_2$ per $cm^3$ of catalyst per sec were formed when finely divided $La_2O_3$ was used as the catalyst. A dramatic improvement, by a factor of 30 to 100 was achieved, also as noted above using the Linde Molecular Catalyst.

This molecular sieve catalyst may also prove adequate for use with CaO to form $Ca(NO_3)_2$ at high pressures, especially when water vapor is added to a significant concentration. The addition of water vapor to the gas mixture has substantially increased the activity of most catalysts, in some cases even more than expected. In most cases, the order with respect to water vapor concentration is first order, $CO_3O_4$ and $Fe_2O_3$ are examples. The dependence on water vapor when quartz wool was used as the catalyst was found to be proportional to the square root of the water vapor concentration. The presence of water vapor, however, complicates the mechanisms by which the nitrogen is fixed.

While specific embodiments of the invention have been shown and described in detail to illustrate the application of the principles of the invention, it will be understood that the invention may be embodied otherwise without departing from such principles.

What is claimed is:

1. A process for the fixation of nitrogen comprising:
    combining gaseous nitrogen and oxygen at a total pressure of above 100 atmospheres and at a working pressure range, with a metal oxide and at least 0.5% by weight water;
    providing a catalyst with the gaseous nitrogen and oxygen, metal oxide and water, the water acting to increase the activity of the catalyst;
    initially heating the combination to a working temperature range sufficient to form a nitrate and below the dissociation pressure of the nitrate corresponding to the working temperature and pressure ranges; and
    thermally insulating the reaction to maintain the working temperature range;
    the temperature range being between 500° and 800° C. and near thermal equilibrium for the nitrogen and oxygen to nitrogen oxide's reaction.

2. A process according to claim 1, wherein solid metal oxide is used as the metal oxide.

3. A process according to claim 1, wherein the metal oxide is chosen from the group consisting of an oxide of calcium, strontium, barium, and iron.

4. A process according to claim 1, wherein said catalyst is chosen from the group consisting of quartz wool, $Co_3O_4$, $Fe_2O_3$, NiO, and an alumina-silicate molecular sieve catalyst.

5. A process according to claim 1, wherein said catalyst comprises a Linde Molecular Sieve No. LZ-Y52.

6. A process for the fixation of nitrogen comprising:
    combining gaseous nitrogen and oxygen at a total pressure of above 100 atmospheres and a working pressure range, with a metal oxide;
    providing an alumina-silicate molecular sieve catalyst base as a cite for the nitrogen fixation process; and
    initially heating the combination to a working temperature range sufficient to form a nitrate and below the dissociation pressure of the nitrate corresponding to the working temperature and pressure range;
    the temperature range being between 500° and 800° C. and near thermal equilibrium for a nitrogen and oxygen to nitrogen oxide's reaction.

7. A process according to claim 6, including adding water to the combined gaseous nitrogen and oxygen plus metal oxide mixture.

8. A process according to claim 6, including thermally insulating the reaction to maintain the working temperature range without substantial additional heating.

9. A process according to claim 6, wherein the molecular sieve catalyst comprises a Linde Molecular Sieve member LZ-Y52.

* * * * *